Patented Sept. 14, 1954

2,689,231

UNITED STATES PATENT OFFICE 2,689,231

COPOLYMERS OF CONJUGATE AND NON-CONJUGATE DRYING OILS, CYCLOPENTADIENE, AND STYRENE

James F. McKenna, Milwaukee, Wis., assignor to Pittsburgh Plate Glass Company, Allegheny, Pa., a corporation of Pennsylvania No Drawing. Application June 10, 1950,
Serial No. 167,484

6 Claims. (Cl. 260—23.7)

The present invention relates to the preparation of coating compositions, and it has particular relation to the preparation of coating compositions containing vehicles which are obtained by conjointly polymerizing a drying glyceride oil, cyclopentadiene or its copolymers, and a monomeric compound containing a benzene nucleus with an ethylenically unsaturated side chain or group.

One object of the invention is to provide a three-component copolymer of the foregoing type in which homogeneity or compatibility of the several components is readily attained.

A second object of the invention is to provide a copolymer which is of high oil content and also of relatively high viscosity.

A third object is to provide a coating composition which is well adapted for use as a sealing or first coating for walls, and particularly for interior walls.

These and other objects will be apparent from consideration of the following specification and the appended claims.

It has therefore been proposed to prepare copolymers of cyclopentadiene and unsaturated glyceride oils, such as soybean oil, linseed oil and the like, by heating together, preferably under superatmospheric pressure, mixtures of cyclopentadiene or its lower homopolymers, such as dicyclopentadiene. By such operation, products were obtained which, if of long oil length, were liquid vehicles suitable for use in coating media. These vehicles, when spread as films, would dry very fast and hard. They were also resistant to alkalies and to water. Copolymers of shorter oil length could also be prepared which were either very viscous or were gums and which were suitable for cooking into oil, such as the conventional drying glyceride oils, to provide vehicles of high solids content that were also adapted to dry very quickly.

Patents covering these types of products include the following:

Gerhart, 2,387,895
Gerhart, 2,390,530
Gerhart, 2,392,140
Gerhart, 2,392,732
Gerhart, 2,397,600
Gerhart, 2,398,889
Lycan et al., 2,443,044

It has further been proposed to prepare copolymers of cyclopentadiene (or its lower homopolymers), drying oils, and an ethylenically unsaturated homologue or derivative of benzene, such as styrene. These three-component products were characterized by their high capacity for wetting pigments which were incorporated therein.

Difficulties, however, have been encountered in the preparation of these materials, especially in those cases where the proportion of cyclopentadiene or dimers thereof were comparatively low. In some cases, the unsaturated glyceride oil exhibited a tendency to be incompatible with the styrene component, so that adequately homogeneous products could not be obtained. Furthermore, the viscosity of the three-component copolymers was often relatively low, a feature which was especially objectionable where the products were to be employed as sealing coatings or first coatings upon relatively porous materials, such as wood, plaster, concrete, brick, or the like.

The present invention is based upon the discovery of the capacity of glyceride oils containing large amounts of conjugately unsaturated fatty acids in the molecule, and notably Chinawood oil, even in moderate amounts, for imparting homogeneity and high viscosity to products of copolymerization of a non-conjugated oil such as soybean oil, linseed oil or comparable oil, cyclopentadiene and styrene.

THE MATERIALS USED

Applicant's copolymerizable mixtures comprise the following materials approximately within the ranges indicated:

(A) Cyclopentadiene or a lower homopolymer thereof 5 to 30% by weight of the total mixture.

(B) A phenyl compound having an ethylenically unsaturated side chain 10 to 45% by weight of the total mixture.

(C) An oil mixture constituting 45 to 70% by weight of the total mixture and comprising: an unsaturated glyceride containing but little or no conjugate unsaturation, 50 to 85% by weight of the mixture.

(D) A glyceride drying oil containing conjugate or diene unsaturation in the fatty acid radicals 15 to 50% by weight of the mixture.

(A) The diene hydrocarbon

The diene hydrocarbon preferably is cyclopentadiene or one of its lower homopolymers, e. g. dicyclopentadiene or tricyclopentadiene. Since the homopolymers depolymerize under reaction conditions to form the monomer, the term "cyclopentadiene" is to be interpreted as being generic. That is, it is to be understood that dicyclopentadiene or tricyclopentadiene are really to be considered as cyclopentadiene in the reaction, since the products derived therefrom are the same. The cyclopentadiene or its lower homopolymers preferably constitute approximately 5 to 30% by weight of the total mixture.

(B) The ethylenically substituted benzene

The compound having a benzene nucleus with ethylenically unsaturated side chain will have the double bond, in most cases, in alpha-beta position. The benzene nucleus will have one to two such side chains. They may be coupled to the benzene group at one or both ends. One coupling will be carbon to carbon. The other may be carbon to carbon, or the carbon of the side chain may be coupled to the benzene nucleus through an oxygen linkage.

Examples of these substituted benzenes may comprise styrene, alpha methyl or para methyl styrene, divinyl benzene, and others. The invention also contemplates the use of mixtures of mutually compatible compounds of the class. The class may be represented by the partial formula:

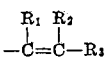

where $R_1$ and/or $R_2$ are hydrogen or hydrocarbon. $R_1$ and/or $R_2$ may, for example, be methyl ethyl propyl or similar groups. $R_3$ may be hydrogen, hydrocarbon, or oxygen. $R_3$, if hydrocarbon or oxygen, may be directly coupled to the benzene ring, usually in the ortho position, to provide an unsaturated heterocyclic ring. The side chain usually will contain 2 to 3 carbon atoms exclusive of those commonly shared by benzene and the total carbon content of the ethylenically unsaturated side chains usually will not exceed 5 carbon atoms.

The compound containing the benzene with the ethylenically unsaturated side chain may be in a proportion of approximately 10 to 45% by weight of the total mixture of the four components (cyclopentadiene, ethylenically substituted benzene, conjugately unsaturated oil, and non-conjugate oil).

(C) The non-conjugated glyceride oil

The non-conjugated glyceride oil may be the usual glyceride oils having drying or semi-drying properties. These include linseed oil, soybean oil, cottonseed oil, or mixtures thereof, etc. Soybean oil is especially important, inasmuch as it is plentiful, but usually it is somewhat slow of drying when incorporated into a paint or varnish. Appropriately modified, by polymerization with cyclopentadiene, phenyl compound having an ethylenically unsaturated side chain, e. g. styrene or its equivalent, it will dry quite readily to provide hard and chemically resistant films. The oil may be raw or refined soybean oil, or it may be a fraction of soybean oil, e. g. extract oil as obtained by subjecting soybean oil to solvent fractionation with a polar solvent, in the manner disclosed in U. S. Patents 2,200,390 and 2,200,391.

(D) The conjugated oil

The conjugated glyceride oil preferably is China-wood oil or tung oil, but it is contemplated to replace the latter in part (5 to 75%) or in toto with other oils comprised largely or primarily of glycerides of conjugated unsaturated fatty acids. These oils include oiticica oil, and others which are characterized by a high degree of conjugate diene unsaturation in the fatty acid radicals of the glycerides.

Usually, at least 15 or 20% by weight of the oil mixture (components C and D) will be of the conjugated type. The proportion of the conjugated oil may be much higher than this. However, since conjugated oils are usually more expensive than the non-conjugate oil, it is, in most cases, economically preferable to employ only such amounts of a conjugated oil as will provide a homogeneous product of desired viscosity when the several components are copolymerized. Pure China-wood oil, however, is unnecessary, not only because of the costs thereof, but also because premature gelation tends to result during the copolymerization. Ranges of China-wood oil or other conjugated oil between 15 and 50% by weight, based upon the oil mixture, are contemplated.

The total oil in the products usually will constitute a range of 45 to 70% by weight of the mixture.

METHODS OF PREPARING THE COPOLYMER PRODUCTS

Applicant has discovered a number of different modes of combining or reacting the several components of the product:

(A) All four components of the reaction mixture, with or without a catalyst of addition, may be introduced into a suitable pressure vessel and heated to reaction temperature under superatmospheric pressures until samples of the material, when drawn off, respond satisfactorily to a suitable viscosity test. Such test may comprise the Gardner-Holdt test which is conventional in the industry and, therefore, need not be described. The product, in most instances, will be reacted until a fairly high viscosity is attained. Usually, the viscosity, after the materials are diluted, will be S or T or higher. So long as the product is not insoluble in solvents, such as xylol, toluene or petroleum naphtha, it is within the purview of the invention.

(B) Cyclopentadiene and the oil mixture may be copolymerized by heat and pressure, in accordance with the disclosures of the previously mentioned patents to Gerhart or Lycan, et al. It is advantageous though not essential to blow the intermediate copolymer with inert gas such as carbon dioxide, to remove volatile odoriferous components such as unreacted cyclopentadiene. Other methods of deodorization such as application of steam and/or vacuum are also contemplated. The copolymerized intermediate product may then be further copolymerized with the ethylenically unsaturated phenyl compound, under superatmospheric pressure, in an appropriate container, e. g. an autoclave.

It is also contemplated to copolymerize the intermediate product with a phenyl compound having an ethylenically unsaturated side chain, e. g. styrene, by effecting the reaction at atmospheric pressure, but preferably under a reflux condenser designed to condense and return vaporized reactants to the reaction zone. In this reaction, a peroxide type catalyst of addition, e. g. benzoyl peroxide, cumene hydroperoxide, lauroyl peroxide, tertiary butyl peroxide or tertiary butyl hydroperoxide and others, may be employed to promote the reaction. It is contemplated that the catalyst constitutes .2 to 5% by weight of the total mixture.

(C) Cyclopentadiene and non-conjugate oil, e. g. soya oil or linseed oil, may be reacted under superatmospheric pressure in an autoclave, and the mixture, with or without peroxide catalyst, may be further copolymerized with the ethylenically substituted benzene monomer and China-wood oil in desired proportions.

(D) Styrene, and mixtures of a non-conjugated oil (soya oil, linseed oil or the like) and a conjugated oil, e. g. China-wood oil, or oiticica oil, may be reacted under heat, with or without peroxide catalysts, and the product can then be further copolymerized with cyclopentadiene in an autoclave or other container adapted to maintain the reaction mixture under superatmospheric pressure during the course of the copolymerization.

(E) The cyclopentadiene and the ethylenically unsaturated phenyl compound, e. g. styrene, may be heated in an autoclave until a soluble gum is formed. It is contemplated to cook this gum into a mixture of China-wood oil and soya bean oil to provide products suitable for use as coatings for wood, plaster or the like.

THE REACTION OF THE STYRENE WITH THE OTHER COMPONENTS OF THE MIXTURE

In the reaction of such ethylenically unsaturated phenyl derivatives as styrene with the other components, in accordance with the procedures A to E inclusive, or in similar procedures, it is desirable to add the styrene, e. g. commercial styrene such as is used in synthetic rubber, at such rate and at such moderate temperature, e. g. below 200° C. or thereabouts, as will prevent excessive vaporization of styrene. Clearer products are obtained if the temperature does not drop below about 160° C. Excessive vaporization is undesirable, especially where the reaction between the styrene and the other components is conducted at atmospheric pressure, because it is then impossible to condense and return the vapors sufficiently rapidly to the reaction zone. If the reaction is conducted under superatmospheric pressure, the temperature may be higher than at atmospheric pressure. It should not be so high as to induce charring or discoloration. Manifestly, if styrene is volatilized to too great an extent, the temperature and the rate of introducing it into the reaction mixture can be reduced until the volatilization can be brought under control.

THE TEMPERATURE OF REACTION

The temperature of copolymerization of styrene and the other components is ultimately raised to 200 or 250° C. and above, e. g. up to 300° C. or even to 350° C., until an ultimate viscosity of desired value, as determined by taking samples and subjecting them to viscosity tests, is attained. These temperatures can apply to modes of procedure A to E, inclusive. Other temperatures, if they are not so high as to decompose or otherwise degrade the product, are contemplated.

THE TIME OF COPOLYMERIZATION

With respect to time of reaction of the ethylenically substituted benzene and/or cyclopentadiene with the other components, there can be no limit set that will apply under all conditions and for all products. The time may be short, e. g. 2 or 3 hours, if high temperatures and a closed system admitting of high pressures is employed. On the other hand, if low temperatures are employed, the reaction may proceed for 30 or 40 hours, or even longer. Excessively long periods usually are to be avoided, but theoretically are permissible. Frequent viscosity tests constitute the best means for determining when the reaction has proceeded for a sufficiently long period of time. The viscosity, of course, will vary, depending upon the use and the manner of treating the finished product. As previously stated, an ultimate value of S or T or higher, after the product is diluted, is preferred.

THE APPARATUS

The reaction or reactions involved can be conducted in practically any convenient embodiment of apparatus appropriate for the conduction of cooking operations under reflux or under pressure. For example, on a small scale, a glass flask, such as a three-neck flask, may be employed. This embodiment of apparatus may include a heater, an agitator to maintain motion and commingling of the reactants, a thermometer and a funnel, or a burette, or other devices designed to feed the reactants into the container. Also, one of the necks of the flask should be provided with a reflux condenser designed to return volatilized reactants to the reaction zone. An autoclave provided with the necessary temperature registering devices, pressure gauges, heating devices, and the like may also be employed.

The following examples illustrate typical applications of the principles of the invention:

EXAMPLE I

A four-component product was prepared embodying, as its ingredients, alkali refined soybean oil, China-wood oil, cyclopentadiene and styrene. The reaction was performed in the three-neck flask equipped as previously described. Soybean oil was introduced into the container in a proportion of 876 grams and the China-wood oil in a proportion of 274 grams. The temperature was raised to 160° C., vapors escaping from the reaction mixture being condensed and refluxed to the mixture. To this mixture of oils, a mixture comprising 660 grams of styrene, 220 grams of dicyclopentadiene, and 20 grams of cumene hydroperoxide was introduced, with agitation, over a period of 6 hours while the reaction mixture was maintained at an average temperature of 162° C.

When all of the reactants were introduced, the temperature was raised to a value of 295° C. over a period of 24 hours. It was then maintained at the desired temperature range for 3 hours. The product was cooled down to 240° C. within a period of 30 minutes. Samples, when thinned to 64.5% by weight solids content by means of a solvent consisting of a 3 to 1 mixture of mineral spirits and xylol, at room temperature, exhibited a body of I, a color of 12 (Gardner), and an iodine value of 59.

Samples of this material were further diluted with the same mineral spirits to a body of G, and were admixed with .04% by weight of cobalt in the form of a naphthenate. They were allowed to stand over-night, and were spread upon panels to form films which set to touch in 1 hour and were hard-dried in 4 hours. The films had good texture, adhesion and flexibility. They were well adapted to coat surfaces and had good water and alkali resistance. The liquid resinous products were compatible with large quantities of mineral spirits and with a large number of different types of paint or varnish vehicles.

EXAMPLE II

In this example, 20 parts by weight of cyclopentadiene, 16 parts by weight of China-wood oil, and 64 parts by weight of soya oil were admixed with 24.8 parts by weight of styrene and 1 part by weight based upon the total mixture of cumene hydroperoxide. The catalyzed styrene was introduced over a period of 1½ hours at a temperature of 188° C. The temperature was raised to 278° C. in 6 hours and maintained at that value for 2½ hours. This provided a product which had a color of 13, a body of G and an iodine value of 66, when diluted to a solids content of 57% by weight in mineral spirits. When mixed with drier as in Example I, films of this solution set to touch in 1⅓ hours and were hard-dried in 4¾ hours. The films were of good color, tack-free, were of excellent texture, and were tough. They also had good adhesion and were non-brittle. Such a material is well adapted for use as a surface coating.

EXAMPLE III

In this example, a charge comprising 74.2 parts by weight of refined soya oil, 18.5 parts by weight of tung oil, and 8.2 parts by weight of dicyclopentadiene was heated to a temperature of 170° C. The apparatus was operated under atmospheric pressure, but under the reflux condenser. An additional 8.1 parts of cyclopentadiene were then added, over a period of 30 minutes. The temperature of the reaction mixture was raised to 200° C. over a period of 4⅔ hours.

The reaction mixture was then cooled down to 160° C. The cooled mixture was styrenated with a mixture of 62.3 parts by weight of styrene and 26.7 parts of alpha methyl styrene catalyzed with 2 parts of cumene hydroperoxide. This mixture was introduced over a period of 6 hours at 160° C. The temperature of the reaction mixture was then raised to 280° C. in a period of 28 hours, where it was held for an additional 3⅓ hours. The product was cooled to about 200° C. in the reaction vessel and was then thinned by the addition of 25 parts by weight of xylol and 75 parts of naphtha of about 36 K. B. value. The resultant product had a body of Q, a color of 13, an iodine value of 53, and a solids content of 65 percent by weight. It could be used as a sealer coating and for other purposes.

EXAMPLE IV

In this example, an intermediate copolymer of soya oil, China-wood oil and cyclopentadiene was prepared from a mixture comprising 56% of soya oil, 24% China-wood oil, and 20% of cyclopentadiene. (Percentages are by weight.) This copolymer, of course, could be prepared by the heat and pressure method or similar method, as disclosed in the previously mentioned patents to Gerhart or Lycan. A mixture of 74.2% by weight of this copolymer, 24.8% of styrene, and 1% of cumene hydroperoxide was introduced into a reactor, in accordance with the techniques previously described. The mixture was heated to reaction temperature, at atmospheric pressure, until a product of a body of V (Gardner-Holdt) and a color of 12 (Gardner), at 50% by weight solids in mineral spirits, was obtained. This product when spread as a film upon a test slab, such as a slab of glass, set to touch in 1¼ hours and was hard-dried in 3¾ hours. The product, after aging for two weeks, had good texture, good adhesion and good flexibility. It also was resistant to water and alkali. Furthermore, the composition, before spreading, was compatible with large quantities of mineral spirits and with different types of vehicles. The resultant product was suitable for use as a sealer or first coating.

The four component copolymers herein disclosed can be admixed with compatible resins and solvents which are non-reactive therewith or with reactive compounds so long as the fundamental nature of the products is not too markedly changed.

The forms of the invention herein described are to be regarded as constituting illustrations of the practice of the invention. It will be apparent to those skilled in the art that many modifications may be made therein without departure from the spirit of the invention or the scope of the appended claims.

I claim:

1. As a new coating material, a viscous, homogeneous copolymer of 5% to 30% by weight of cyclopentadiene, 10% to 45% by weight of a monomer compound consisting of a benzene ring having an $\alpha,\beta$-ethylenically unsaturated hydrocarbon side chain, the remainder of the copolymer being of a mixture of glyceride oils in which 15% to 50% by weight is China-wood oil and the remainder is a non-conjugately unsaturated drying glyceride oil.

2. A viscous, homogeneous copolymer of 5% to 30% by weight of cyclopentadiene, 10% to 45% by weight of styrene, and the remainder of the copolymer being a mixture of glyceride oils in which 15% to 50% by weight is China-wood oil and the remainder is soybean oil.

3. A method which comprises heating together at a temperature of 160 to 350° C. a mixture of 5 to 30 percent of a compound of the group consisting of cyclopentadiene and lower homopolymers thereof, 10 to 45 percent of styrene and 45 to 75 percent of a glyceride oil based upon the entire mixture; 50 to 85 percent of said glyceride oil being essentially nonconjugately unsaturated, the balance of said oil being conjugately unsaturated.

4. As a new coating material, a viscous, homogeneous copolymer comprising 5 to 30 per cent by weight of cyclopentadiene, 10 to 45 per cent by weight of a compound which is a monomer consisting of a benzene ring having an alpha-beta ethylenically unsaturated hydrocarbon side chain, the remainder of the copolymer being a mixture of glyceride oils in which 15 to 50 per cent by weight is a conjugately unsaturated drying oil, and the rest of the mixture is a non-conjugately unsaturated drying oil.

5. In a method of forming a soluble, viscous, polymer product of (A) 5 to 30 per cent by weight of a compound of the group consisting of cyclopentadiene and lower homopolymers thereof, (B) 10 to 45 per cent by weight of a compound which is a monomer consisting of a benzene ring having an alpha-beta ethylenically unsaturated hydrocarbon side chain, the remainder of the product being a mixture of glyceride oils, of which 15 to 50 per cent by weight is conjugately unsaturated drying glyceride oil, the rest being nonconjugately unsaturated drying glyceride oil, the step of heating at a temperature of 160 to 350° C, a composition containing the foregoing materials in the proportions stated until said materials are copolymerized and said soluble viscous product is formed.

6. The method as defined in claim 5, in which the monomer compound consists of styrene.

References Cited in the file of this patent

UNITED STATES PATENTS

| Number | Name | Date |
|---|---|---|
| 2,397,600 | Gerhart | Apr. 2, 1946 |
| 2,601,273 | Gerhart | June 24, 1952 |

FOREIGN PATENTS

| Number | Country | Date |
|---|---|---|
| 614,532 | Great Britain | Dec. 16, 1948 |